US008584429B2

(12) United States Patent  (10) Patent No.: US 8,584,429 B2
Zavitz et al.                (45) Date of Patent:    Nov. 19, 2013

(54) TOWER ERECTION SYSTEM AND METHOD

(71) Applicant: Tindall Corporation, Spartanburg, SC (US)

(72) Inventors: Bryant A. Zavitz, Dunwoody, GA (US); William Lowndes, III, Spartanburg, SC (US)

(73) Assignee: Tindall Corporation, Spartanburg, SC (US)

( * ) Notice: Subject to any disclaimer, the term of this patent is extended or adjusted under 35 U.S.C. 154(b) by 0 days.

(21) Appl. No.: 13/627,674

(22) Filed: Sep. 26, 2012

(65) Prior Publication Data

US 2013/0081337 A1    Apr. 4, 2013

Related U.S. Application Data

(60) Provisional application No. 61/541,303, filed on Sep. 30, 2011.

(51) Int. Cl.
*E04G 21/00*    (2006.01)
(52) U.S. Cl.
USPC ............ 52/745.18; 52/123.1; 52/745.03; 52/745.04
(58) Field of Classification Search
USPC ......... 52/745.17, 745.18, 121, 122.1, 123.1, 52/745.03, 745.04, 848, 651.01, 651.07; 29/897.3, 897.31, 897.312; 212/233, 212/242, 251, 259, 326, 327, 270, 271, 212/296–298, 199–202
See application file for complete search history.

(56) References Cited

U.S. PATENT DOCUMENTS

| | | | | |
|---|---|---|---|---|
| 3,354,599 A | * | 11/1967 | Martin | 52/745.17 |
| 3,789,565 A | * | 2/1974 | Lindholm | 52/745.01 |
| 3,945,107 A | | 3/1976 | Houck | |
| 4,028,792 A | * | 6/1977 | Tax et al. | 29/431 |
| 4,757,592 A | * | 7/1988 | Reed | 29/429 |
| 6,614,125 B2 | | 9/2003 | Willis et al. | |
| 6,868,646 B1 | * | 3/2005 | Perina | 52/745.17 |
| 7,877,934 B2 | | 2/2011 | Livingston et al. | |
| 8,011,098 B2 | * | 9/2011 | Vorhies et al. | 29/889.2 |
| 8,240,051 B2 | * | 8/2012 | Fedock et al. | 29/890.033 |

(Continued)

FOREIGN PATENT DOCUMENTS

EP    1350953 A2    10/2003

OTHER PUBLICATIONS

PCT International Search Report and PCT Written Opinion of the International Searching Authority for PCT International Application No. PCT/US2012/057409 both completed Feb. 20, 2013 and mailed Feb. 21, 2013.

*Primary Examiner* — Brian Glessner
*Assistant Examiner* — Adam Barlow
(74) *Attorney, Agent, or Firm* — Oblon, Spivak, McClelland, Maier & Neustadt, L.L.P.

(57) ABSTRACT

Systems and methods are disclosed for erecting a tower. The subject system includes a tower, which may include a base portion and a plurality of tower sections. The subject system may further include a frame provided on the tower, a crane provided on the frame, and a self-hoist system for elevating and lowering the frame relative to the tower. Erection of the tower is facilitated through use of the self-hoist system to elevate the frame, and use of the crane to provide various tower sections on the base portion and an initial tower section or sections.

13 Claims, 19 Drawing Sheets

(56) References Cited

U.S. PATENT DOCUMENTS

| | | | |
|---|---|---|---|
| 2003/0183594 A1* | 10/2003 | Torres Martinez | 212/196 |
| 2003/0213765 A1 | 11/2003 | St-Germain | |
| 2006/0272244 A1* | 12/2006 | Jensen | 52/223.5 |
| 2009/0307998 A1 | 12/2009 | Zavitz et al. | |
| 2009/0308006 A1 | 12/2009 | Zavitz et al. | |
| 2009/0308019 A1 | 12/2009 | Knox et al. | |
| 2010/0044330 A1 | 2/2010 | Vorhies et al. | |
| 2010/0281819 A1 | 11/2010 | Thompson | |
| 2011/0067353 A1* | 3/2011 | Tadayon | 52/745.18 |
| 2012/0131880 A1* | 5/2012 | Delago et al. | 52/745.18 |

* cited by examiner

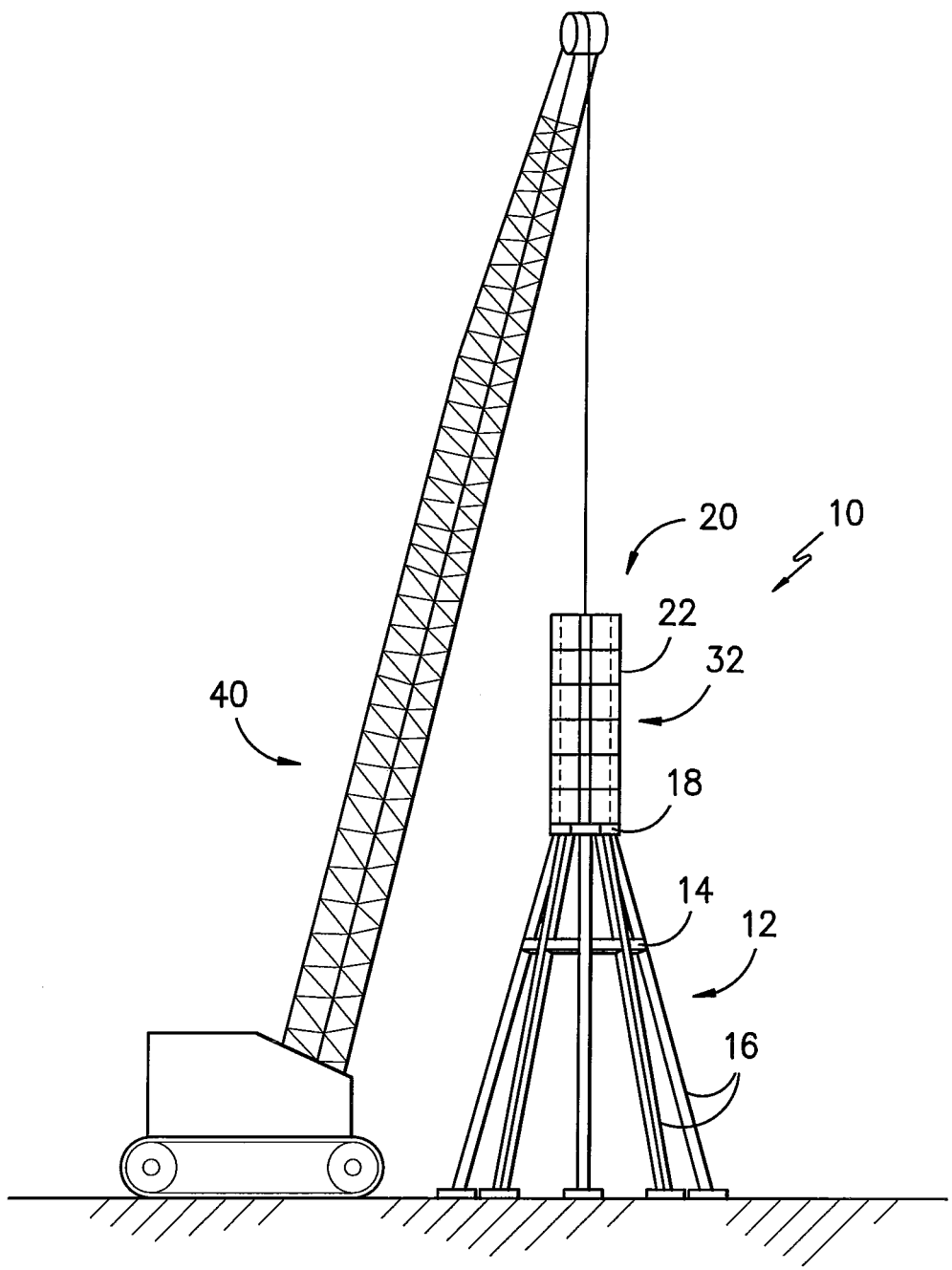
FIG. -1-

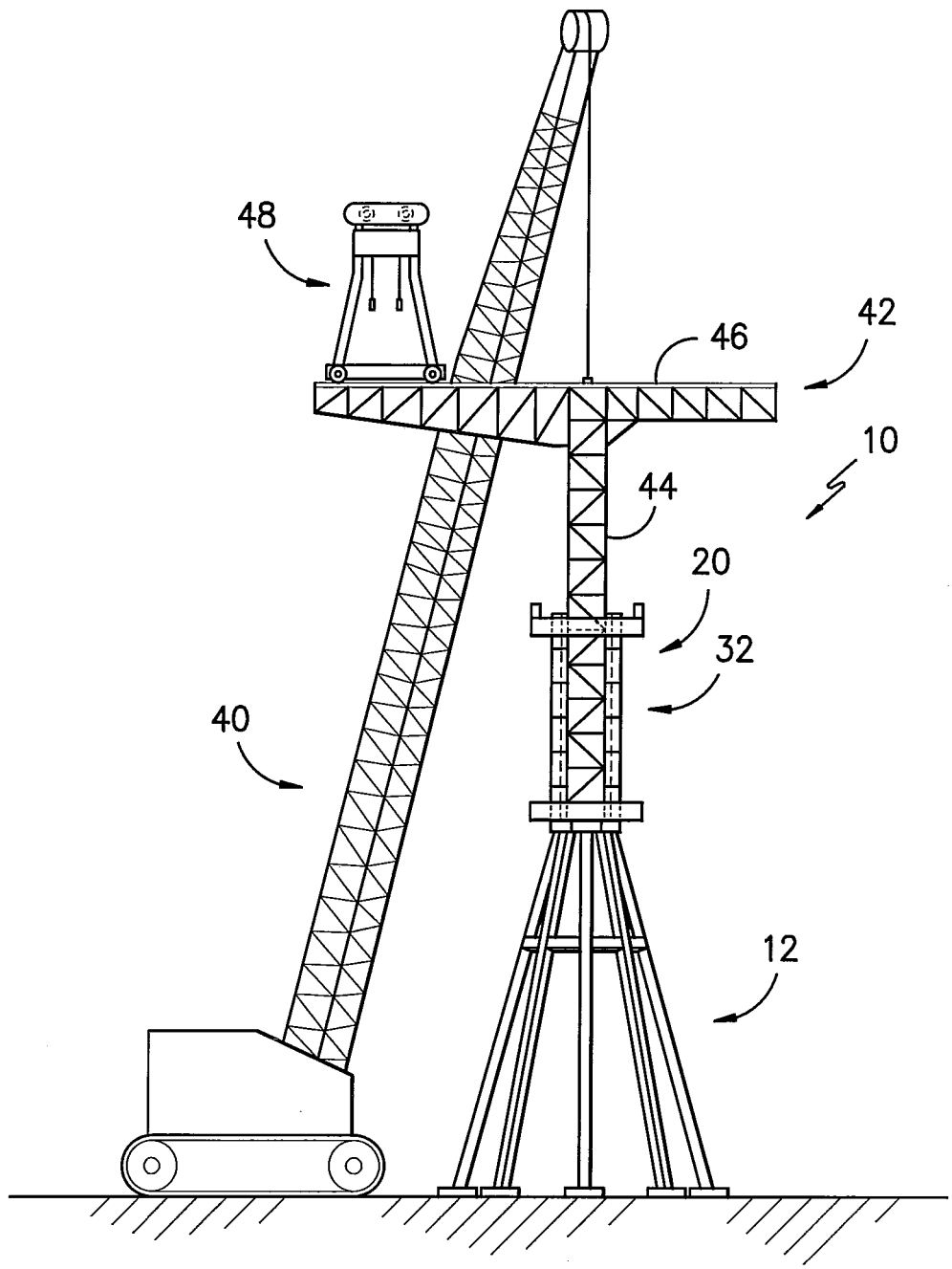
FIG. -2-

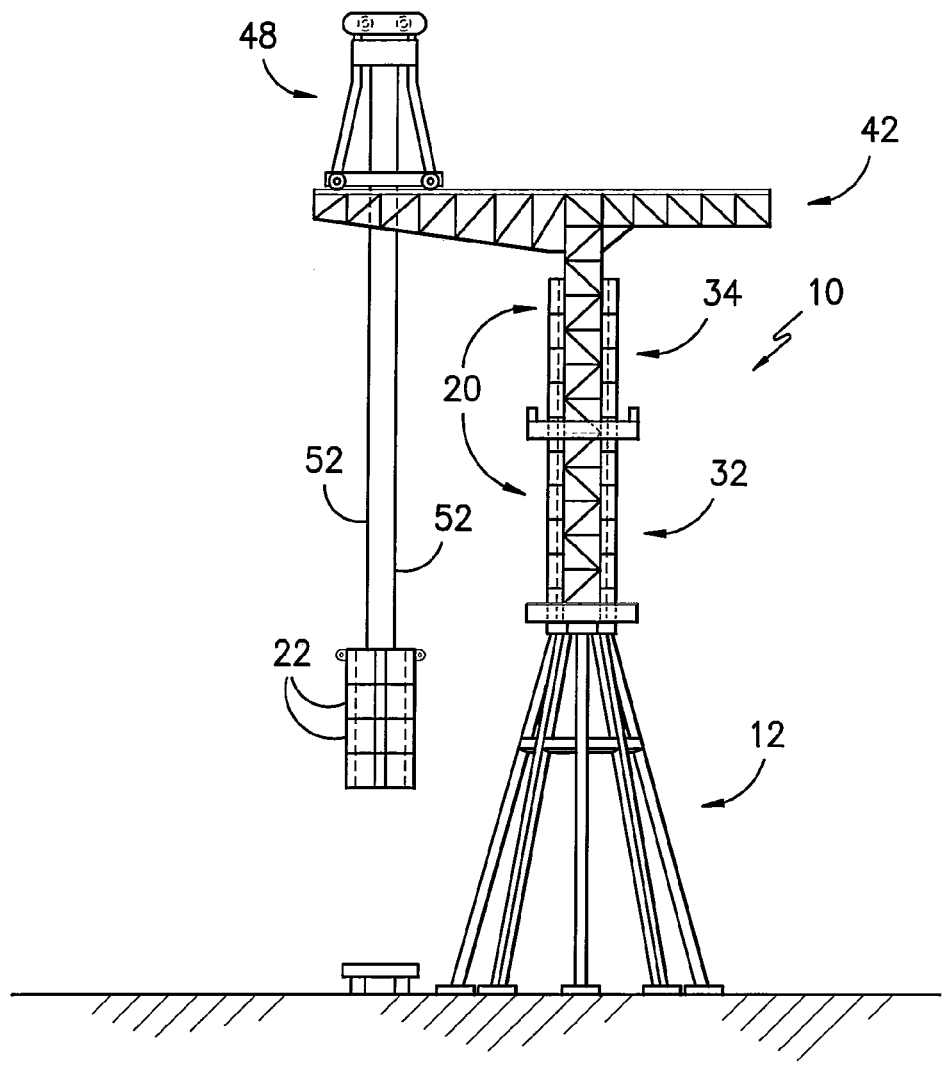
FIG. -3-

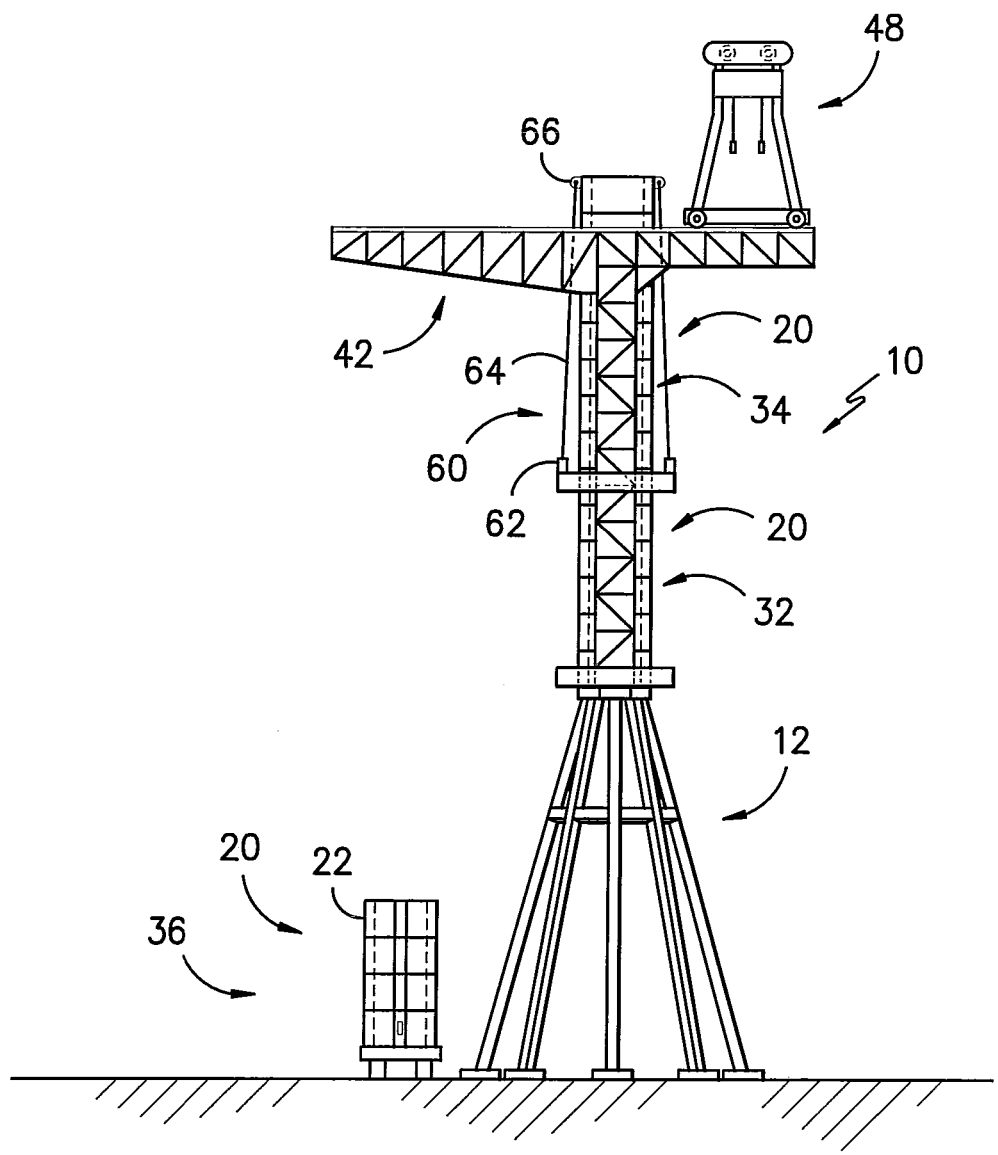
FIG. —4—

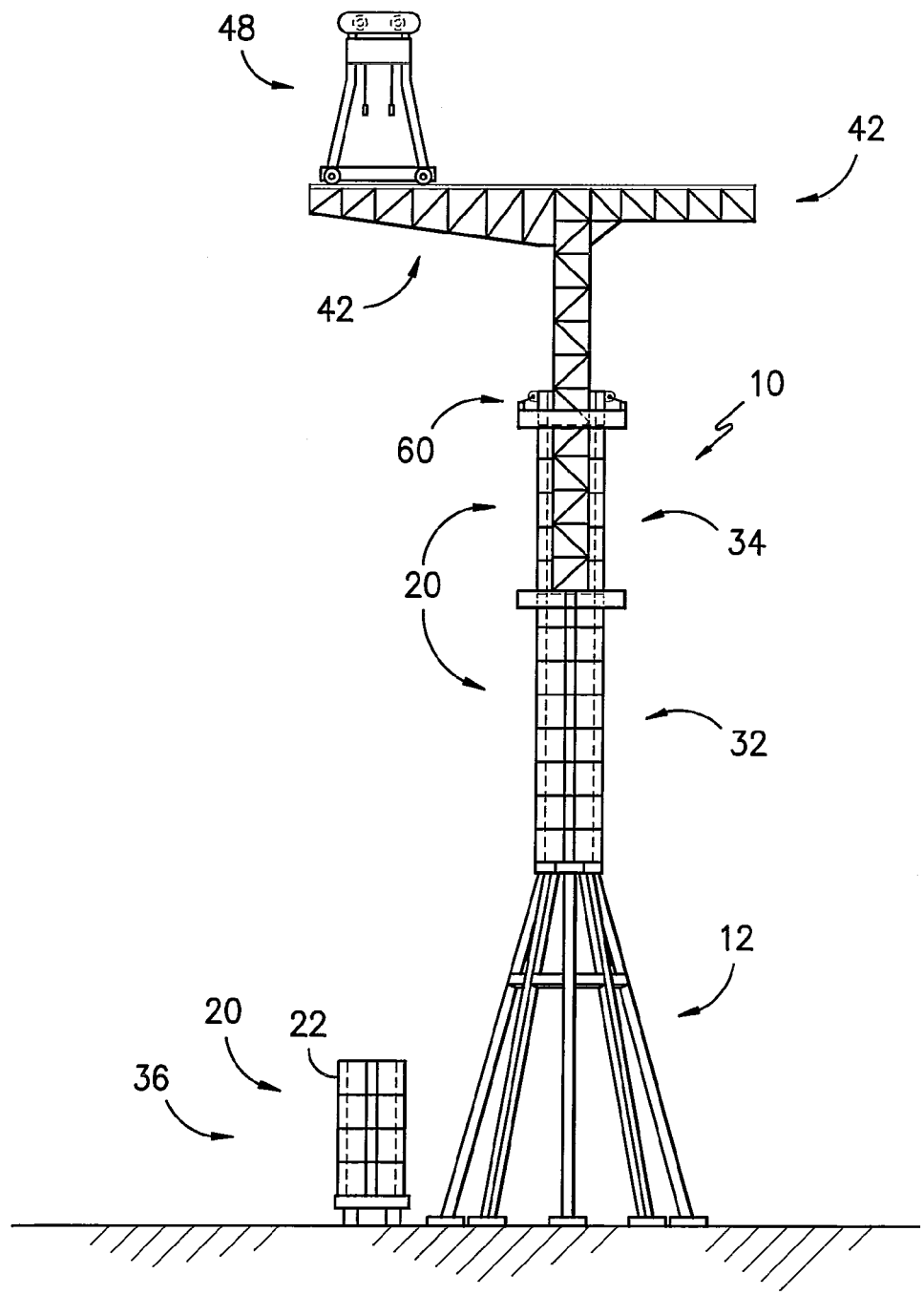
FIG. -5-

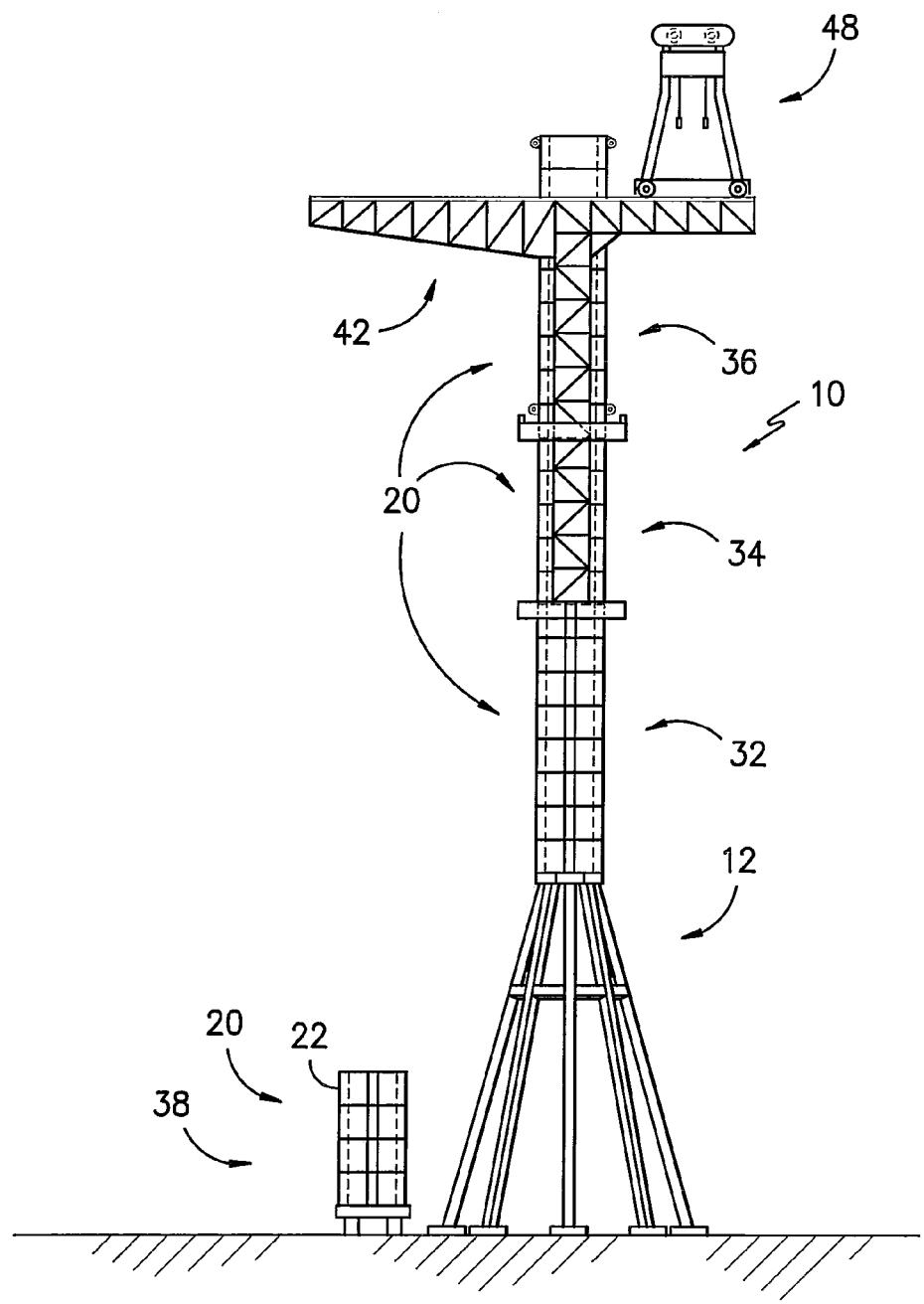
FIG. -6-

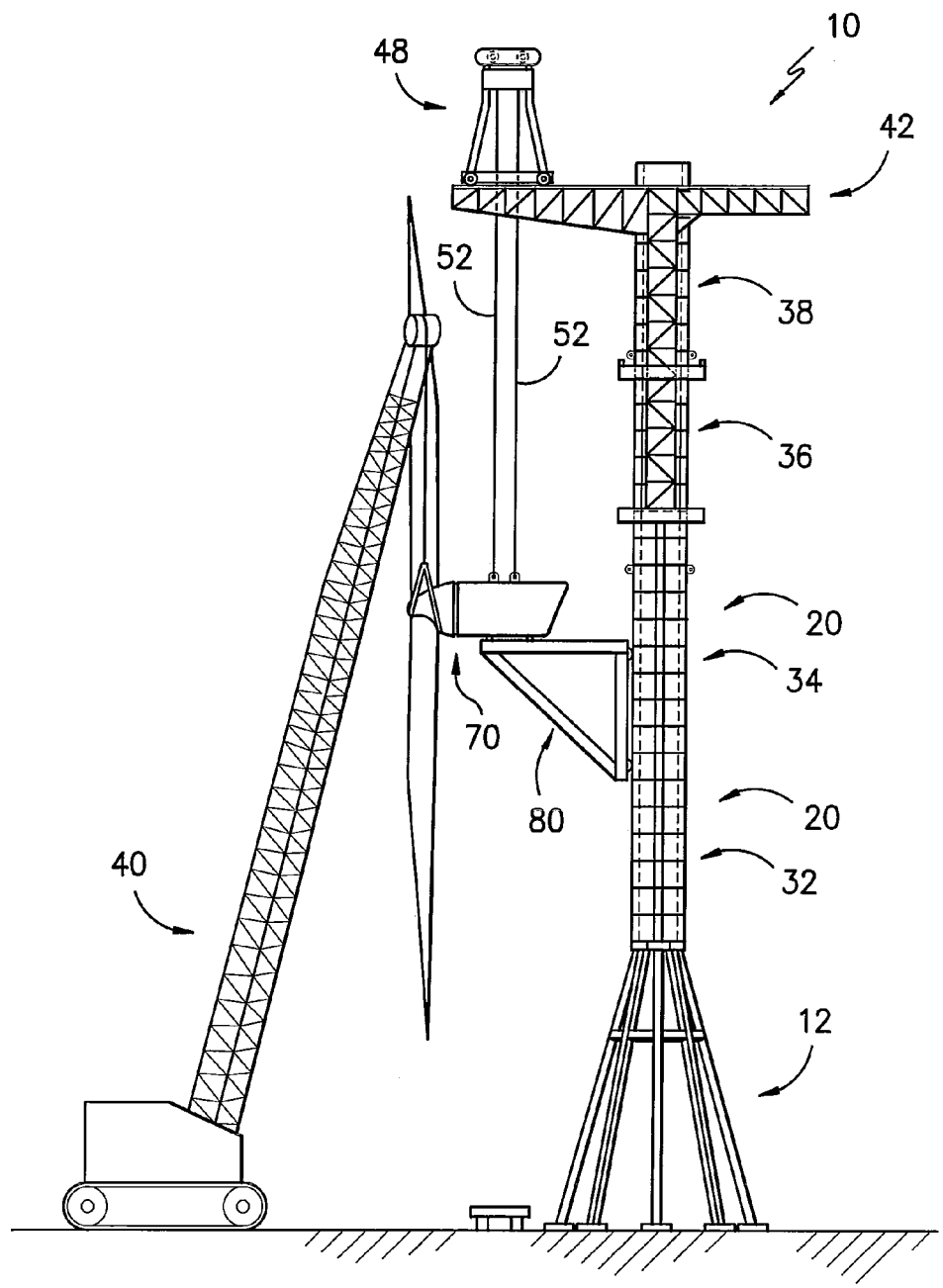
FIG. -7-

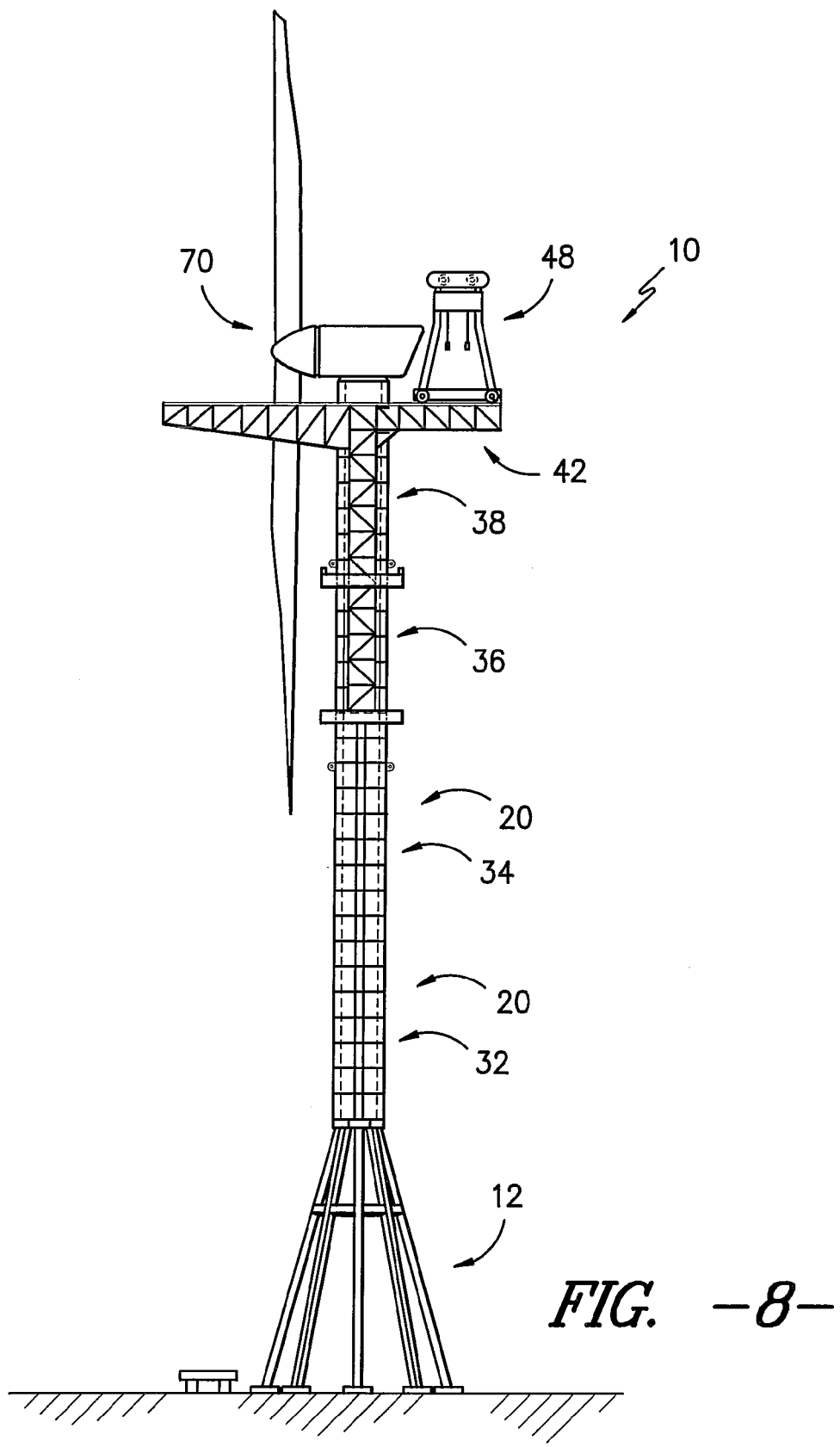
FIG. -8-

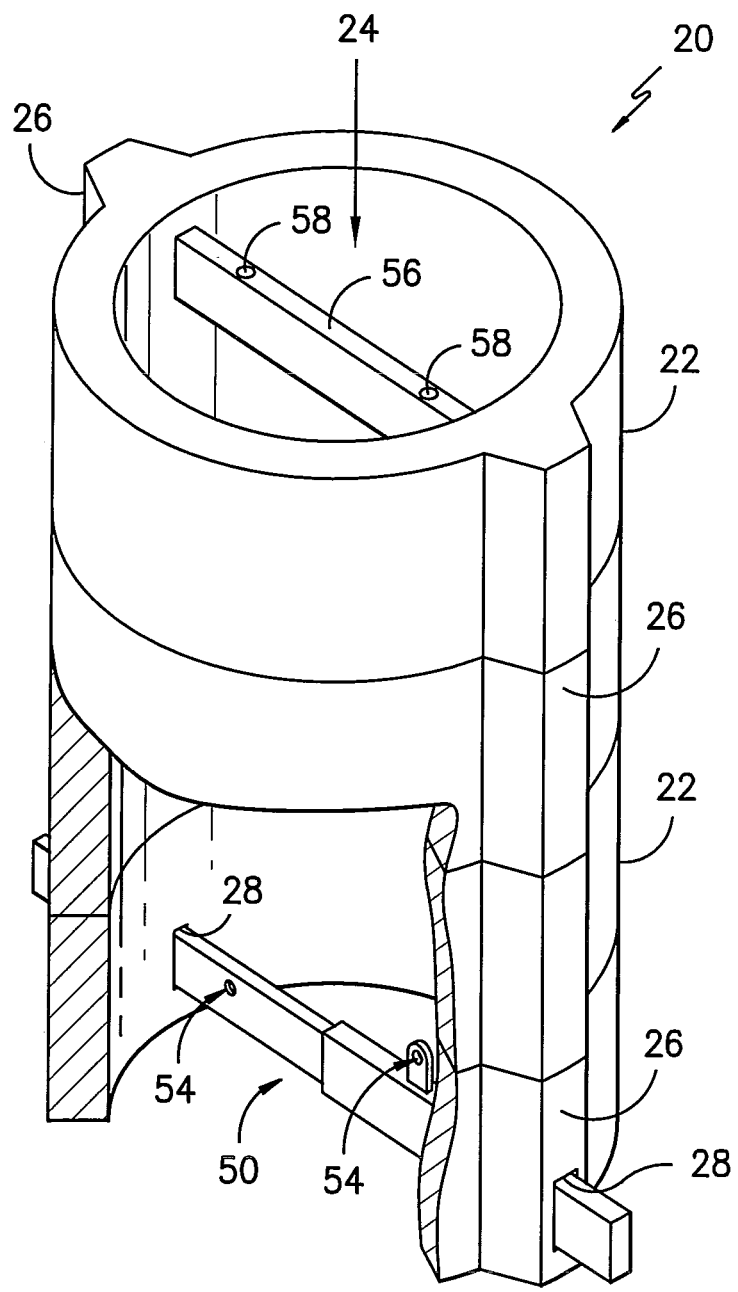
FIG. -9-

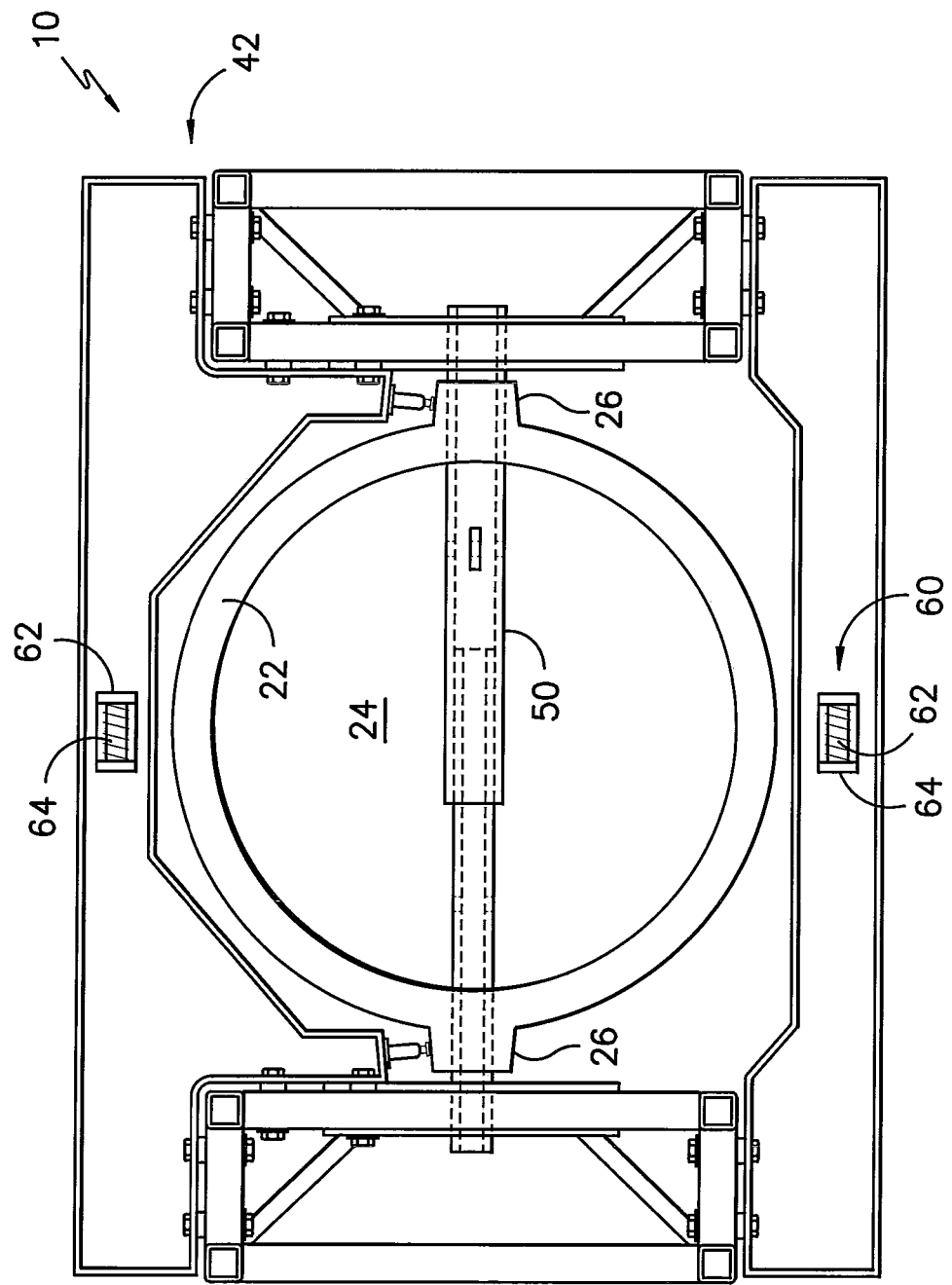
FIG. -10-

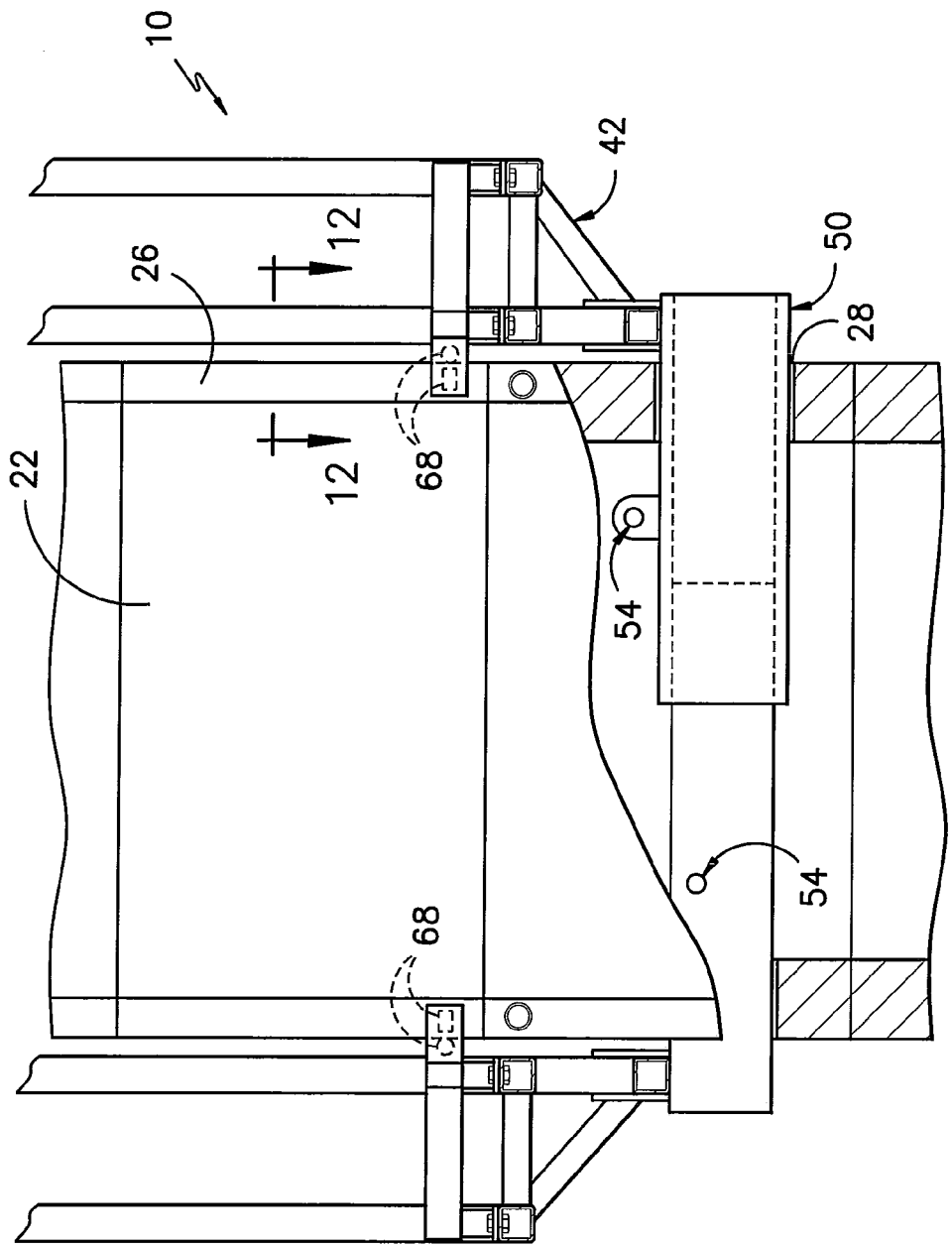
FIG. -11-

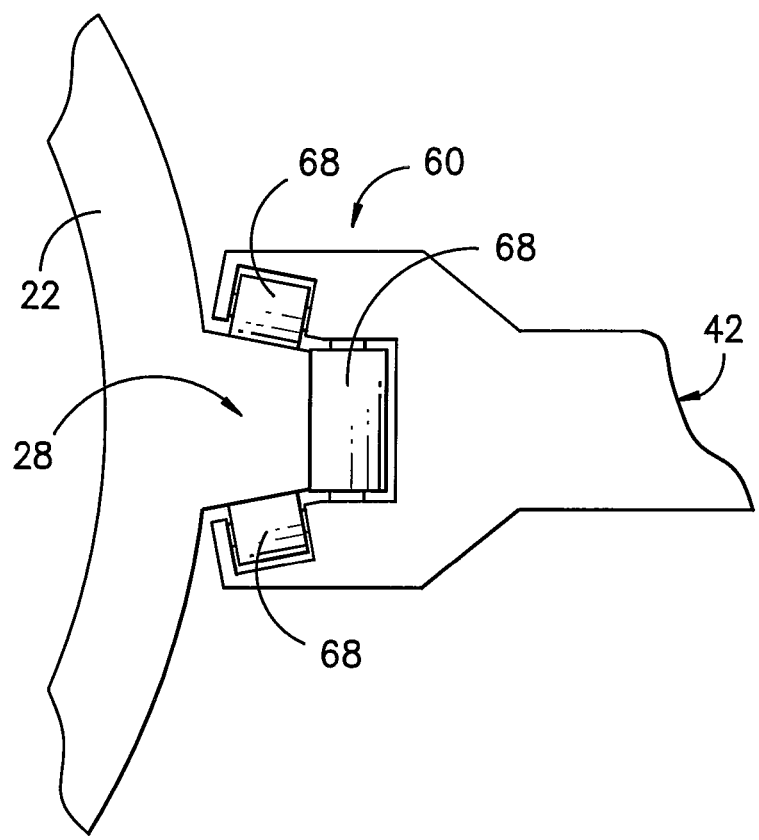
FIG. —12—

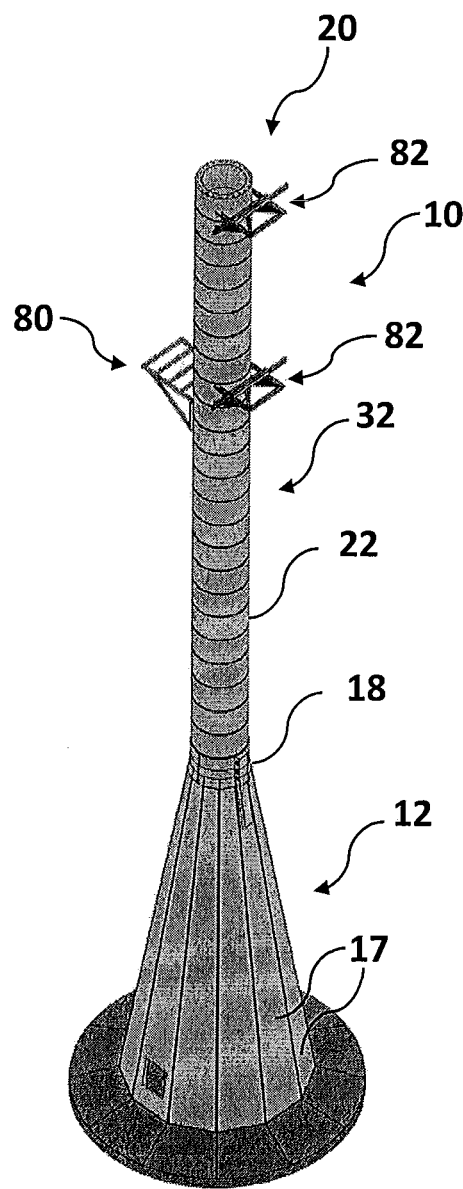
FIG. -13-

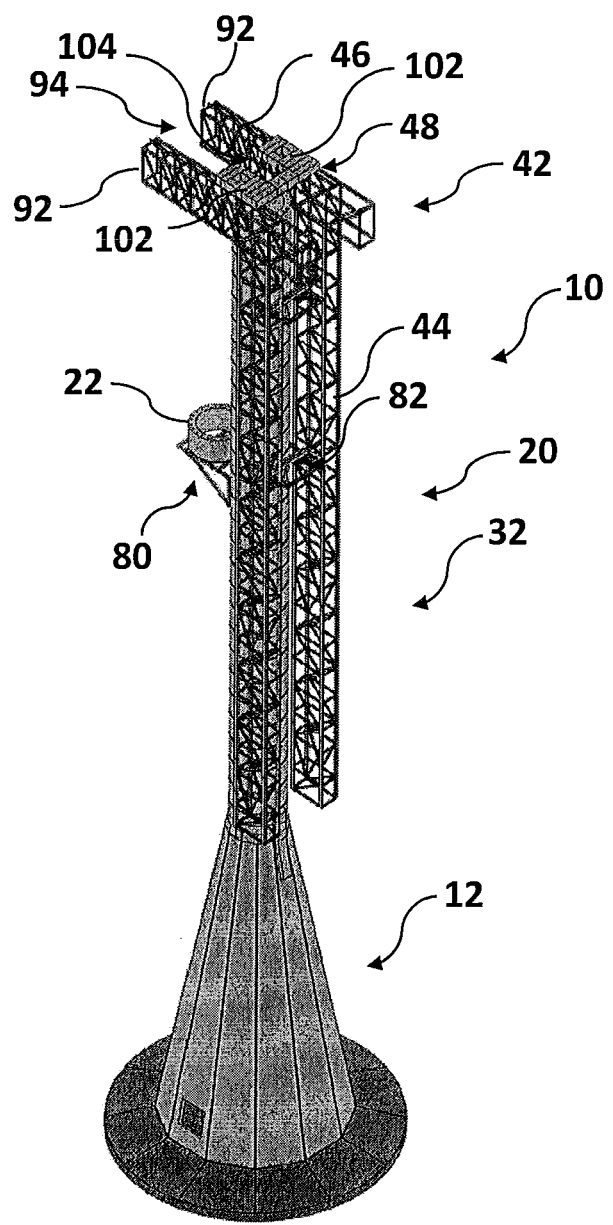
FIG. -14-

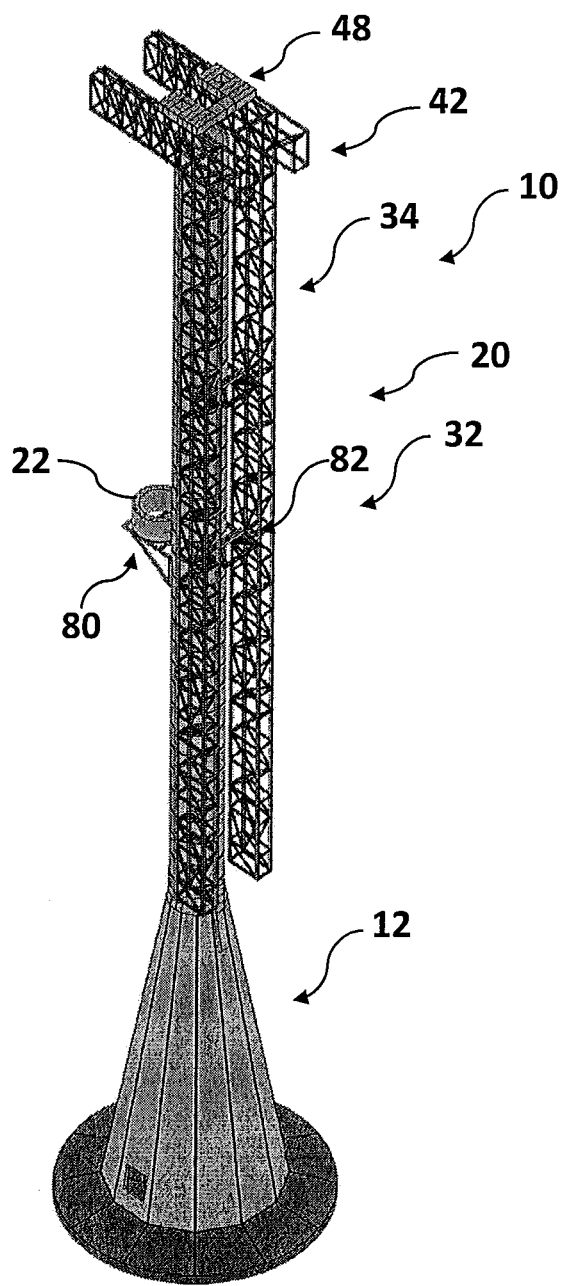
FIG. -15-

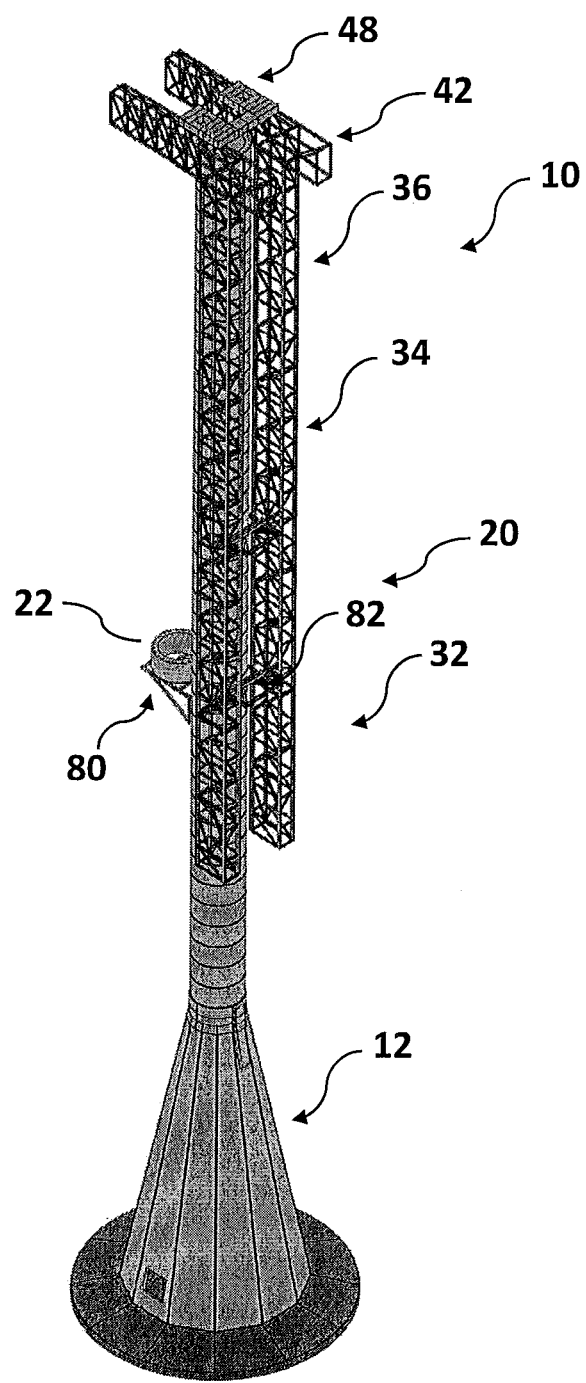
FIG. -16-

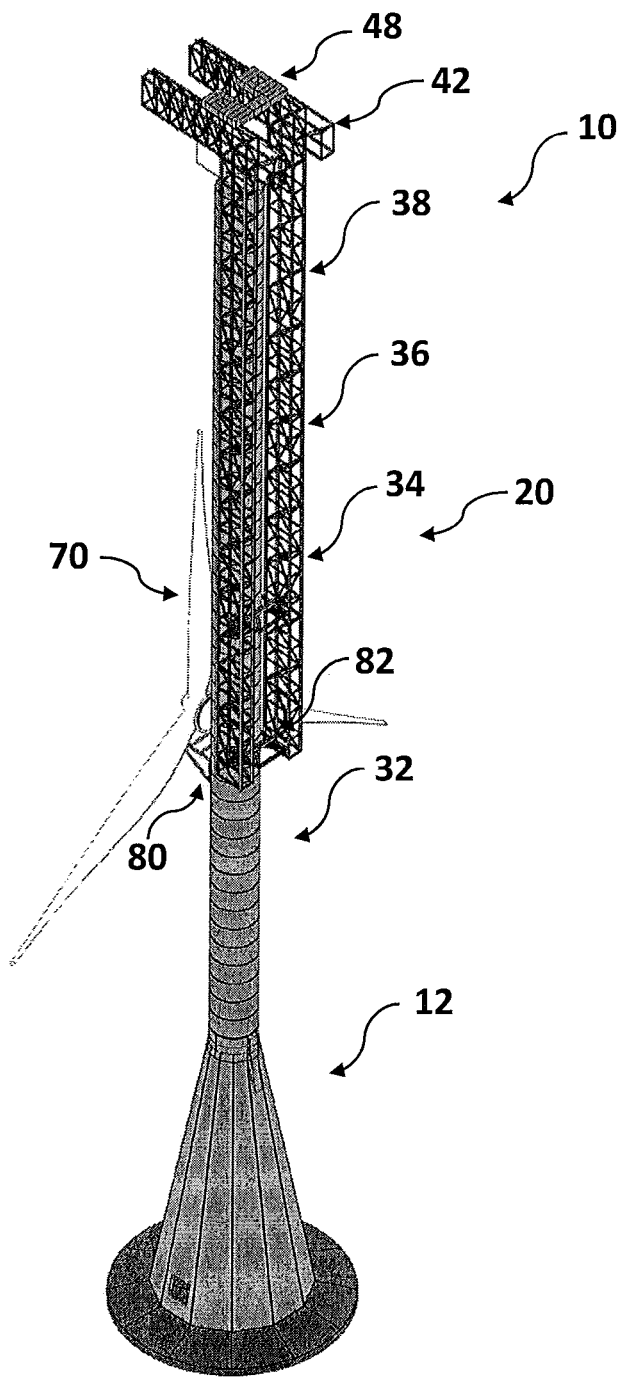
FIG. -17-

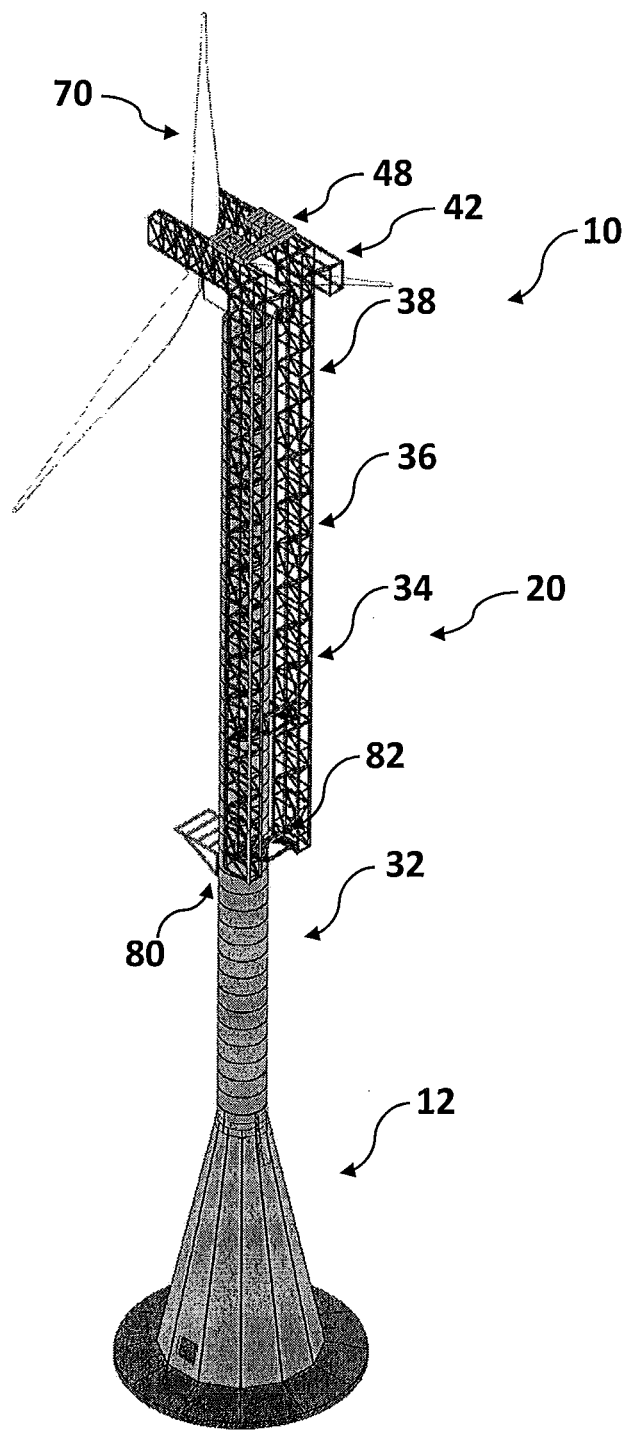
FIG. -18-

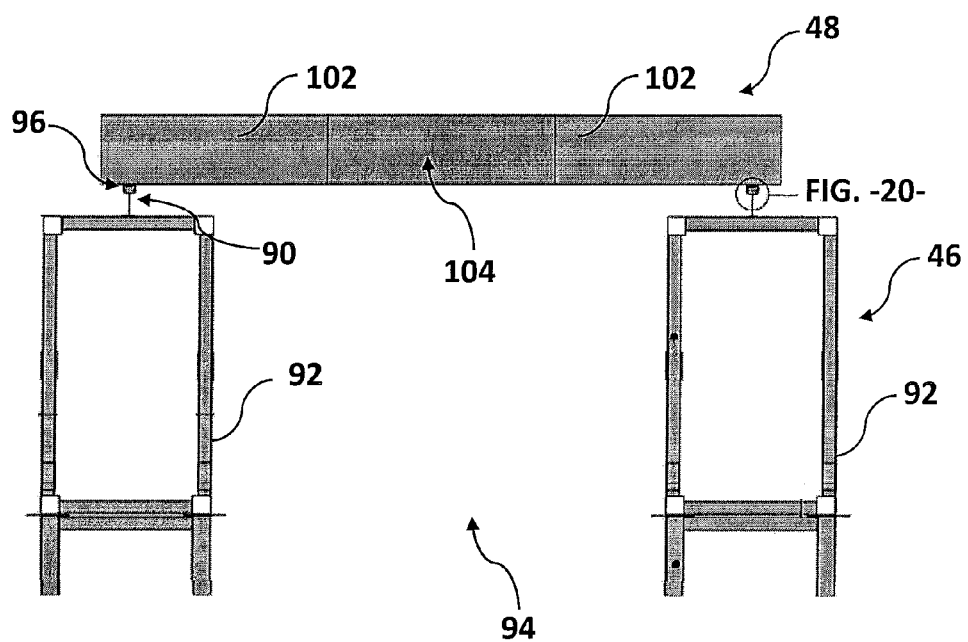
*FIG. -19-*
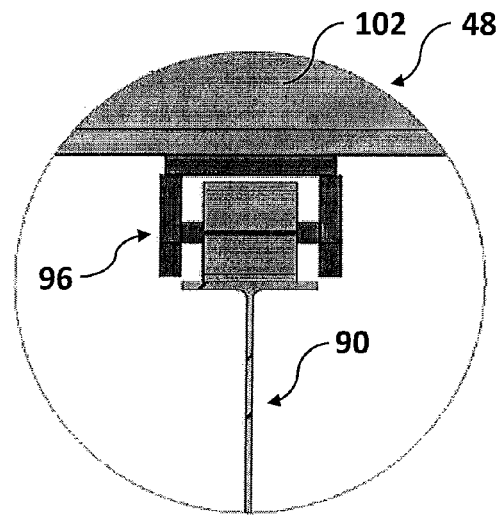
*FIG. -20-*

TOWER ERECTION SYSTEM AND METHOD

PRIORITY CLAIM

This application claims the benefit of previously filed U.S. Provisional Patent Application entitled "TOWER ERECTION SYSTEM AND METHOD," assigned U.S. Ser. No. 61/541,303, filed Sep. 30, 2011, and which is incorporated herein by reference for all purposes.

FIELD OF THE INVENTION

The present subject matter relates generally to tower structures, and more specifically to systems and methods for erecting tower structures.

BACKGROUND OF THE INVENTION

Construction of towers for support of various items has been practiced for many years. Various towers of various materials, including wood, steel, and, more recently, concrete, have been provided to support, for example, electrical transmission lines. In like manner, wind driven apparatus including windmills and wind-driven power generators in various forms and designed for many purposes (including, for example, pumping of water from wells as well as, more recently, generation of electrical power) have also been developed.

Various systems and methods are known in the tower construction and support arts for erecting tower structures. For example, U.S. Pat. No. 3,945,107 to Houck discloses a process for erecting a vertical rising mast. U.S. Pat. No. 6,614,125 to Willis et al. discloses a method and means for mounting a wind turbine on a tower. U.S. Pat. No. 7,877,934 to Livingston et al. discloses a lifting system and apparatus for constructing wind turbine towers. U.S. Pat. Appl. Pub. No. 2010/0281819 to Thompson discloses a slip formed concrete wind turbine tower. Further examples of erection methods and apparatus are disclosed in Zavitz et al. (U.S. Pat. App. Pub. No. 2009/0307998), Zavitz et al. (U.S. Pat. App. Pub. No. 2009/0308006), and Knox et al. (U.S. Pat. App. Pub. No. 2009/0308019).

The subject matter of each of the above-referenced published patent-related documents is fully incorporated herein by reference, and for all purposes.

Many known systems and methods for erecting tower structures are slow and cumbersome, requiring, for example, numerous external cranes or other machinery to lift and position the various elements of the tower structures relative to each other. Additionally, as tower structures increase in size and height, available cranes and other machinery may not be capable of placing various elements of the tower structures at their required heights. For example, presently known cranes may not be capable of hoisting tower elements above heights of approximately 75 meters. However, some tower structures may require elements that are disposed at 120 meters, or higher. Further, the forces required to lift the various elements of a tower structure utilizing currently known systems and methods may be relatively high, due to the weight of the elements and the heights to which the elements must be hoisted.

Thus, system and method subject matter for erecting a tower structure that is relatively fast and efficient would be desired in the art. Additionally, system and method subject matter for erecting a tower structure that allows elements of the tower structure to be placed at relatively high heights would be advantageous. Further, system and method subject matter for erecting a tower structure that does not require large forces to lift the various elements of the tower structure relative to each other would be desirable.

SUMMARY OF THE INVENTION

Aspects and advantages of the present subject matter will be set forth in part in the following description, or may be apparent from the description, or may be learned through practice of the present subject matter.

In view of the recognized features encountered in the prior art and addressed by the present subject matter, improved systems and methods are presently disclosed for erecting tower structures. It should be appreciated that while the present disclosure is directed in exemplary fashion to tower structures involving precast concrete and steel, various presently disclosed constructions involving any suitable materials may be alternatively practiced in accordance with the present subject matter.

In addition, it should be appreciated that while the present disclosure is directed in exemplary fashion to tower structures for windmills and similar devices, such is not necessarily a specific limitation of the present subject matter. For example, it should be clear to those of ordinary skill in the art that a tower constructed in accordance with the present technology may well be used to support, for example, a television transmitter aerial or other radio signal broadcasting aerial.

Alternatively, towers constructed in accordance with the present technology may be used to support any type of device that may require placement above local ground level for more effective operation. Such other present uses may include, for example, towers for electrical power transmission lines or athletic field lighting equipment.

It is a general object of the present disclosure to provide improved system and method subject matter for erection of tower structures. It is a more specific object of the present disclosure to provide system and method subject matter for erection of tower structures that provides for relatively fast, efficient erection of such tower structures, that allows elements of such tower structures to be placed at relatively high heights, and/or that does not require large forces to lift the various components of such tower structures.

A present exemplary tower may include, for example, a base portion and one or more tower sections provided on the base portion. A frame and crane may be provided on the base portion and initial tower section or sections to facilitate the provision of further tower sections on the initial tower sections. The frame may include a self-hoist system, which may controllably elevate and/or lower the frame relative to the tower as desired or required. Thus, erection of the tower is facilitated through use of the self-hoist system to elevate the frame and use of the crane to provide various tower sections on the base portion and initial tower section or sections.

In an exemplary embodiment, the frame is provided on a first tower section. A second tower section is then provided on the first tower section via a crane mounted on the frame. The frame is then elevated relative to the tower, in exemplary embodiments via a self-hoist system. A third tower section is then provided on the second tower section via the crane. The frame may then be further elevated, and a fourth tower section provided on the third tower section. Such sequence of steps may be repeated as desired or required until sufficient tower sections have been provided such that the tower is at a desired or required height.

A tower section according to the present disclosure may, in exemplary embodiments, include a plurality of ring segments. Each ring segment may further include pilasters. The frame may be provided on the tower through engagement of the pilasters, and may thus be guided by the pilasters during elevation and/or lowering.

A self-hoist system according to the present disclosure may, in exemplary embodiments, include one or more hoisting devices, such as winches, as well as cables connected to the hoisting devices and hoist points on a tower section for connection thereto by the cables. A self-hoist system may additionally include guide rollers for engagement with the pilasters to facilitate guiding of the frame.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents, including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects herein, and/or other features, components, or steps as otherwise discussed in this application. Those of ordinary skill in the art will better appreciate the features and aspects of such embodiments, and others, upon review of the remainder of the specification. The accompanying drawings, which are incorporated in and constitute a part of this specification, illustrate and represent embodiments of the present subject matter and, together with the description, serve to explain various aspects of the present subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which, as non-limiting exemplary embodiments and configurations only:

FIG. 1 illustrates a base portion of a tower with a first tower section provided thereon;

FIG. 2 illustrates portions of a tower with a frame and crane provided thereon;

FIG. 3 illustrates a crane hoisting a second tower section relative to portions of a tower;

FIG. 4 illustrates portions of a tower including a second tower section provided on a first tower section;

FIG. 5 illustrates portions of a tower with a frame and crane hoisted to an elevated position;

FIG. 6 illustrates portions of a tower including a third tower section provided on a second tower section;

FIG. 7 illustrates portions of a tower with a frame and crane hoisted to a further elevated position and including a fourth tower section provided on a third tower section, with the crane hoisting a representative wind turbine system;

FIG. 8 illustrates a tower including a representative wind turbine system provided on a fourth tower section;

FIG. 9 is a perspective view of a plurality of ring segments forming a portion of a tower section;

FIG. 10 is a top cross-sectional view of a tower with a frame provided thereon;

FIG. 11 is a front cross-sectional view of a tower with a frame provided thereon;

FIG. 12 is a cross-sectional view, along the lines 12-12 of FIG. 11, of a portion of a ring segment and frame;

FIG. 13 illustrates a base portion of a tower with a first tower section provided thereon according to another embodiment of the present disclosure;

FIG. 14 illustrates portions of a tower with a frame and crane provided thereon according to another embodiment of the present disclosure;

FIG. 15 illustrates portions of a tower including a second tower section provided on a first tower section and a frame hoisted to an elevated position according to another embodiment of the present disclosure;

FIG. 16 illustrates portions of a tower including a third tower section provided on a second tower section and a frame hoisted to a further elevated position according to another embodiment of the present disclosure;

FIG. 17 illustrates portions of a tower including a fourth tower section provided on a third tower section and a frame hoisted to a further elevated position, and additionally including a representative wind turbine system provided on a support frame, according to another embodiment of the present disclosure;

FIG. 18 illustrates a tower with a frame and including a representative wind turbine system provided on a fourth tower section according to another embodiment of the present disclosure;

FIG. 19 illustrates a cross-sectional view of a horizontal portion of a frame, including a crane provided on the frame, according to one embodiment of the present disclosure; and FIG. 20 illustrates a close-up cross-sectional view of a crane, including a roller of the crane on a rail of the frame, according to one embodiment of the present disclosure.

Repeat use of reference characters throughout the present specification and appended drawings is intended to represent same or analogous features, elements, or steps of the present subject matter.

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

With reference now to FIG. 1, the tower generally 10 of the present disclosure may include a base portion generally 12. As shown, lateral support structure 14 provides support for a plurality of legs 16. The lateral support structure 14 and legs 16 may be formed from, for example, concrete, cement, steel, or any other suitable material. The lateral support structure 14 may be secured to the legs 16 in any suitable manner. Alternatively, the base portion 12 may be formed using a plurality of circumferentially placed staves 17 secured by various base support pieces, as shown in FIG. 13, or by using any suitable components for forming the base portion as might otherwise be now or later known in the art.

A platform 18 may generally be included on the base portion 12. The platform 18 may secure and support the various components of the base portion 12, and may further act as a transition piece and base for other components of the tower 10 provided on the base portion 12. The platform 18 may be formed from, for example, concrete, cement, steel, or any other suitable material.

A plurality of tower sections 20 may be provided on the base portion 12. For example, a lower section 20 may generally be disposed and secured on the platform 18, and one or more sections 20 may be stacked and secured on the lower section 20 and each other. Each tower section 20 may be formed from, for example, concrete, cement, steel, or any other suitable material. In one embodiment, as shown in FIGS. 1 through 12, a tower section 20 may include a plurality of ring segments 22. The ring segments 22 may each have a generally circular or oval cross-section, or may have any other cross-sectional shape now or later known in the art.

Each of the ring segments 22 may generally define a bore 24 therethrough. Each such bore 24 may have a generally circular or oval cross-section, or may have any other cross-sectional shape now or later known in the art. Further, the respective bores 24 of each of the ring segments 22 may have cross-sectional shapes and sizes that generally correspond to each other, such that when the ring segments 22 are stacked to form the tower section 20, the respective bores 24 collectively form a generally unitary bore through the tower section 20. Alternatively, the tower section 20 may be a singular component defining a bore therethrough.

As shown in detail in FIGS. 9 through 12, a tower section 20 according to the present disclosure, such as each ring segment 22 of a tower section 20, may include one or more pilasters 26. In exemplary embodiments, the pilasters 26 are external pilasters, thus protruding from an external surface of a tower section 20 and/or ring segment 22 thereof. Further, each tower section 20 and/or ring segment 22 thereof in exemplary embodiments includes two generally opposing pilasters 26, as shown. It should be understood, however, that the present disclosure is not limited to two generally opposing pilasters 26. Rather, the inclusion of three, four, five, or more pilasters 26 is within the scope and spirit of the present disclosure. Each pilaster 26 may have a generally rectangular cross-section, or may have an outwardly tapering cross-section as shown, or may have any other suitable cross-sectional profile. Further, one or more slots 28 may be defined in a pilaster 26 of a tower section 20 and/or any ring segment 22 thereof, as shown in FIGS. 9 and 11. A slot 28 according to the present disclosure may extend fully or partially through a pilaster 26. The slots 28 may allow for acceptance therein of various hoisting apparatus, as discussed below.

In an exemplary embodiment, and with practice of the present subject matter, various tower sections 20 may be provided on the base portion 12 during separate time periods. For example, a first tower section 32, which may comprise a ring segment 22 or plurality of ring segments 22, may be provided on the base portion 12 as shown in FIG. 1. Other tower sections 20, such as a second tower section 34, third tower section 36, fourth tower section 38, and/or other various tower sections 20, may then be provided on the first tower section 32, as discussed below.

As discussed above, FIG. 1 illustrates a tower section 20, such as first tower section 32, provided on the base portion 12 of the tower 10. After erection of the base portion 12, the tower section 20 may be provided on the base portion 12 using any suitable methods or apparatus. For example, in exemplary embodiments, a crane 40 may be utilized to hoist and stack the tower section 20 on the base portion 12. The crane 40 may be crane-type apparatus capable of hoisting and stacking, such as any suitable mobile crane, fixed crane, overhead crane, or other suitable crane apparatus, details of which are well known to those of ordinary skill in the art, and which form no particular part of the present subject matter. The crane 40 may be utilized to hoist and stack the tower section 20 as a unit, or may be utilized to hoist and stack one or more components of the tower section 20, such as ring segments 22, at a time to form a tower section 20.

As shown in FIG. 2, after stacking of one or more tower sections 20, such as in exemplary embodiment first tower section 32, a frame 42 may be provided on the tower 10. The frame 42 may generally at least partially surround and/or be disposed adjacent to the initially provided tower section or sections 20, and may be movable connected thereto as discussed below. Frame 42 may include a generally vertical portion 44 and, in exemplary embodiments as shown, a generally horizontal portion 46. A crane 48 may be provided on the frame 42. In exemplary embodiments, the crane 48 is a gantry crane. The gantry crane may be fixed, or may be movable. For example, the gantry crane may be movable along rails (see FIGS. 19 and 20 and discussion below) included on the frame 42, such as on the horizontal portion 46 of the crane 42. Frame 42 and crane 48 may be provided on the tower 10 using any suitable methods or apparatus. For example, in exemplary embodiments, crane 40 may be utilized to hoist and stack the frame 32 and crane 48.

After providing frame 42 and crane 48 on the tower 10, one or more tower sections 20, such as second tower section 34, may be provided on the initially stacked tower section or sections 20, such as first tower section 32. For example, the crane 48 may be utilized to provide such section or sections 20. FIG. 3 illustrates crane 48 hoisting a plurality of ring segments 22, which may form at least a portion of a tower section 20 such as second tower section 34. FIG. 4 illustrates such plurality of ring segments 22 provided on the first tower section 32.

To hoist and stack a tower section 20 or portion thereof, such as a plurality of ring segments 22, crane 48 may be connected to the tower section 20 or portion thereof. FIG. 9 illustrates one embodiment of such connection apparatus. As shown, for example, a beam 50 may be connected to the tower section 20 or portion thereof, such as to a ring segment 22 thereof. The beam 50 may be a telescoping beam, and may extend into the slots 28 defined in a tower section 20 or ring segment 22, thus connecting the beam 50 to the tower section 20 or ring segment 22. Cables 52 from the crane 48 may be connected to the beam 50 via connection points 54 on the beam 50, and the crane 48 may then be operated to lift the beam 50, thus lifting the tower section 20, or ring segment 22 along with any ring segments 22 stacked thereon. In exemplary embodiments, the beam 50 may be connected to the bottom ring segment 22 of a plurality of ring segments 22 to be lifted, so that lifting of such ring segment 22 also lifts any ring segments 22 stacked thereon, as represented.

In some embodiments, a guide frame 56 may additionally be connected to the tower section 20 or portion thereof to be lifted, such as to a ring segment 22 thereof. The guide frame 56 may be a telescoping beam, and may extend into the slots 28 defined in a tower section 20 or ring segment 22, thus connecting the guide frame 56 to the tower section 20 or ring segment 22, or the guide frame 56 may be otherwise connected to the tower section 20 or ring segment 22. Cables 52 from the crane 48 may be extended through bores 58 defined in the guide frame 56. The guide frame 56 may generally stabilize and guide the tower section 20 or portion thereof as it is lifted by the crane 48. In exemplary embodiments, the guide frame 56 may be connected to the top ring segment 22 of a plurality of ring segments 22 to be lifted, such that the guide frame 56 may generally stabilize and guide the entire plurality of ring segments 22 being lifted.

After a tower section or sections 20, such as second tower section 34, are provided on the initial tower section or sections 20, such as first tower section 32, the frame 42 may be hoisted to an elevated position, as shown in FIG. 5. Thus, the frame 42 may include a self-hoist system 60 for elevating and lowering the frame 42 relative to the tower 10, as shown in FIGS. 4, 5, and 10 through 12. Self-hoist system 60 may include one or more hoisting devices 62, such as winches or other suitable devices, connected to the frame 42. One or more cables 64 may be connected to each hoisting device 62. To hoist the frame 42, cables 64 extending from the hoisting device 62 may be connected to hoist points 66 included on a tower section 20 or ring segment 22 thereof. For example, cable 64 may be connected to hoist points 66 above the hoisting devices 62, as shown in FIG. 4, to elevate the frame 42. Operation of the hoisting devices 62 may collect the cables 64 relative to the hoisting devices 62, thus elevating the frame 42 relative to the hoist points 66 and tower 10, or may release the cables 64 relative to the hoisting devices 62, thus lowering the frame 42.

As shown in FIGS. 11 and 12, self-hoist system 60 may further include one or more guide rollers 68. The guide rollers 66 may be connected to the frame 42, and may each engage a pilaster 26. In exemplary embodiments, a plurality of guide rollers 68 may bracket each pilaster 26. Such engagement of the guide rollers 68 and pilasters 26 may guide the frame 42 during elevating and/or lowering of the frame 42.

After the frame 42 is hoisted to an elevated position, such as a first elevated position as shown in FIG. 5, one or more tower sections 20, such as third tower section 36, may be provided on the previously stacked tower section or sections 20, such as first tower section 32 and second tower section 34, as shown in FIG. 6. If desired, the frame 42 may then be hoisted to a further elevated position, such as a second elevated position as shown in FIG. 7. One or more tower sections 20, such as fourth tower section 38, may be provided on the previously stacked tower section or sections 20, as shown. The sequence of steps of providing tower sections 20 and elevating the frame 42 may be repeated as desired or required for erection of the tower 10 to any suitable height.

After erection of the tower 10 to a suitable height as discussed above, upper tower components may be provided on the uppermost tower section 20. For example, FIG. 7 illustrates a representative wind turbine system 70 being hoisted, while FIG. 8 illustrates such representative wind turbine system 70 stacked in position on the tower 10. It should be understood that the present disclosure is not limited to provision of wind tower systems on towers 10, and rather that any suitable upper tower components to be supported, such as television transmitter aerial or other radio signal broadcasting aerial, electrical power transmission lines, or athletic field lighting equipment, are within the scope and spirit of the present disclosure.

In some embodiments, as shown in FIG. 7, a support frame 80 may be connected to the tower 10 or frame 42 to further facilitate erection of the tower 10.

For example, support frame 80 may be utilized to stage various components of the tower, such as tower sections 20 or ring segment 22 thereof, wind turbine systems 70 as shown, or other suitable components. The components may be hoisted to the support frame 80 and provided thereon, such as by crane 40. In some embodiments, further components may then be hoisted to the support frame 80 and provided thereon. Such components may then be hoisted from the support frame 80 for providing them on the tower 10 as discussed above. Thus, hoisting of a component as described herein may include hoisting to the support frame 80 and hoisting from the support frame 80.

The support frame 80 may be connected to the tower 10 or frame 42 at any suitable location. For example, the support frame 80 may be connected at a location between approximately 30% of the total height of the tower 10 and approximately 70% of the total height of the tower 10, between approximately 40% of the total height of the tower 10 and approximately 60% of the total height of the tower 10, between approximately 45% of the total height of the tower 10 and approximately 55% of the total height of the tower 10, or at approximately 50% of the total height of the tower 10, or at any other suitable location or range of locations. The location as described above is the location at which a component may be supported on the support frame 80. The support frame 80 may have any suitable shape, such as triangular, rectangular, or otherwise, for supporting various components of the tower 10. The support frame 80 may be connected to the tower 10 or frame 42 using any suitable connection devices or apparatus. For example, the support frame 80 may be connected to hoist points 66, or may be otherwise mechanically fastened to the tower 10 or frame 42. Advantageously, the use of a support frame 80 to initially support a component, such as a tower section 20 or ring segment 22 thereof or representative wind turbine system 70, at a location along the height of the tower 10 as discussed above may reduce the work required of the crane 48, by requiring the crane 48 to only hoist the component along the remainder of the height from the support frame 80. Such reduction in the workload of the crane 48 may result in substantial cost savings due to reduced crane 48 performance requirements.

It should further be understood that the various methodology described herein may be reversed in order to lower the frame 42, such as after erection of the tower 10 is complete or during disassembly of the tower 10. For example, the self-hoist system 60 may be utilized to lower the frame 42 as desired or required.

FIGS. 13 through 20 illustrate additional embodiments of the present tower erection system and methodology as described above. It should be understood that the crane 40, self-hoist system 60, and various other components are not shown in FIGS. 13 through 20 for the illustrative purposes only. Similar to FIG. 1, FIG. 13 illustrates a tower section 20, such as first tower section 32, provided on the base portion 12 of the tower 10. In this embodiment, the base portion 12 includes circumferentially placed staves 17. As shown, a support frame 80 is connected to the tower 10, such as to the first tower section 32, as discussed above. The support frame 80 may support a tower section 20 or ring segment 22 thereof, as shown in FIGS. 14 through 16, or a representative wind turbine system 70, as shown in FIGS. 17 and 18, or any other suitable tower 10 component. As further shown, additional support frames 82 are connected to the tower 10, such as to the first tower section 32, to provide support to the frame 42 during tower 10 erection. The frame 42, such as the vertical portion 44 thereof, may rest on and be supported by the support frames 82 at various elevations as shown, before and after being hoisted to various elevations as discussed above.

FIG. 14 illustrates the frame 42 provided on the tower 10, such as on the first tower section 32. As shown, a crane 48 is provided on the frame 42, such as on the horizontal portion 46 thereof. In these embodiments, the crane 48 is similarly a gantry crane. As shown, and additionally referring to FIGS. 19 and 20, the gantry crane 48 may be movable along rails 90, which may be mounted on the horizontal portion 46 of the frame 42. For example, the horizontal portion 46 may include two (or more) spaced apart horizontal sections 92, which may define a space 94 therebetween. A rail 90 may be mounted on each horizontal section 92. A rail 90 may be, for example, an I-beam or any other suitably-shaped beam, or any other suitable component along which a crane 48 may travel. The crane 48 may further include rollers 96, each of which may be situated on a rail 90 to facilitate movement of the crane 48 along the rails 90. The rollers 96 may thus roll along the rails 90, moving the crane 48 along the rails 90 and horizontal portion 46 of the frame 42. In some embodiments, the rollers 96 may be further secured to the rails 90 by, for example, pins (not shown) extending through channels (not shown) defined in the rails 90. Any suitable rollers or roller systems may be utilized as rollers 96. For example, embodiments of suitable roller systems for use in accordance with the present disclosure are Hilman Rollers, available from Hilman Incorporated of Marlboro, N.J.

As additionally shown in FIGS. 14 through 19, the crane 48 may in some embodiments include two (or more) spaced apart crane sections 102, which may define a space 104 therebetween. The spaces 94 and 104 defined by the frame 42 and crane 48 may allow portions of components being hoisted by the crane 48, such as representative wind turbine system 70 as shown in FIG. 18, to extend through the spaces 94 and/or 104, and further allow components to be hoisted by the crane 48 closer to the tower 10. This further facilitates fast, efficient tower erection.

FIG. 15 illustrates a second tower section 34 provided on the first tower section 32. Additionally, the frame 42 has been hoisted to an elevated position. It should be noted that, as shown, during or after elevation of the frame 42, additional sections of the vertical portion 44 may be added to the frame 42 or the frame 42 may be telescoped to an elongated length. Thus, the vertical portion 44 in FIG. 15 appears generally longer than the vertical portion 44 in FIG. 14.

FIG. 16 illustrates a third tower section 36 provided on the second tower section 34, and the frame 42 hoisted to a further elevated position. FIG. 17 illustrates a fourth tower section 38 provided on the third tower section 36, and the frame 42 hoisted to a further elevated position. FIG. 18 illustrates representative wind turbine system 70 provided on the fourth tower section 38. As shown, a portion of the system 70 extends between the horizontal sections 92 of the frame 42 and through the space 94 defined thereby.

The present disclosure is further directed to methodology for erecting a tower 10 in accordance with the present subject matter. Such present methodology may include, for example, providing a base portion 12 and one or more tower sections 20, as discussed above. Present methodology may further include providing a frame 42 on the tower 10, providing one or more tower sections 20 on the initially provided one or more tower sections 20, and elevating the frame 42. The frame 42 may be elevated through operation of a self-hoist system 60. Various of such above steps may be repeated as desired to provide additional tower sections 20 and/or other components on the tower 10. Further, various of such above steps may be reversed as desired or required, as discussed above.

The present written description uses examples to disclose the present subject matter, including the best mode thereof, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing, may readily produce alterations to, variations of, and/or equivalents to such embodiments. Accordingly, the scope of the present disclosure is by way of example rather than by way of limitation, and the subject disclosure is not intended to preclude inclusion of such modifications, variations and/or additions to the present subject matter as would be readily apparent to one of ordinary skill in the art.

What is claimed is:

1. A method for erecting a tower, the method comprising:
   providing a frame on a first tower section;
   providing a second tower section on the first tower section;
   hoisting the frame to an elevated position relative to the first tower section and the second tower section; and
   providing a third tower section on the second tower section, wherein a crane disposed on the frame provides the third tower section on the second tower section, and wherein the step of providing the third tower section on the second tower section comprises:
   connecting a beam to the third tower section;
   connecting a cable to the beam, the cable further connected to the crane;
   connecting a guide frame to the third tower section;
   extending the cable through a bore defined in the guide frame; and
   hoisting the third tower section.

2. The method of claim 1, further comprising:
   hoisting the frame to a further elevated position; and
   providing a fourth tower section on the third tower section.

3. The method of claim 2, further comprising providing a wind turbine system on the fourth tower section.

4. The method of claim 1, wherein the frame comprises a self-hoist system configured to hoist the frame.

5. The method of claim 1, wherein the step of hoisting the frame comprises:
   connecting a cable to a hoist point on the second tower section, the cable further connected to the frame; and
   collecting the cable such that the frame is elevated.

6. The method of claim 1, wherein the step of providing the third tower section on the second tower section comprises:
   providing the third tower section on a support platform connected to the tower;
   hoisting the third tower section from the support platform; and
   stacking the third tower section on the second tower section.

7. The method of claim 1, wherein each of the first tower section, the second tower section, and the third tower section comprises at least one ring segment.

8. A method for erecting a tower, the method comprising:
   providing a frame on an initially stacked tower section, the frame comprising a crane thereon;
   connecting a beam to a subsequently stackable tower section;
   connecting a guide frame to the subsequently stackable tower section;

extending a cable through a bore defined in the guide frame;
connecting the cable to the beam and the crane; and
hoisting the subsequently stackable tower section.

9. The method of claim 8, further comprising providing the subsequently stackable tower section on the initially stacked tower section.

10. The method of claim 9, further comprising hoisting the frame to an elevated position relative to the initially stacked tower section and the subsequently stackable tower section.

11. The method of claim 10, wherein the step of hoisting the frame comprises:
connecting a cable to a hoist point on the subsequently stackable tower section, the cable further connected to the frame; and
collecting the cable such that the frame is elevated.

12. The method of claim 8, wherein the frame comprises a self-hoist system configured to hoist the frame.

13. The method of claim 8, wherein each of the initially stacked tower section and the subsequently stackable tower section comprises at least one ring segment.

\* \* \* \* \*